June 11, 1946.  W. C. WEBER  2,401,994
MOLTEN GLASS SEVERING METHOD AND MECHANISM
Filed Feb. 18, 1942
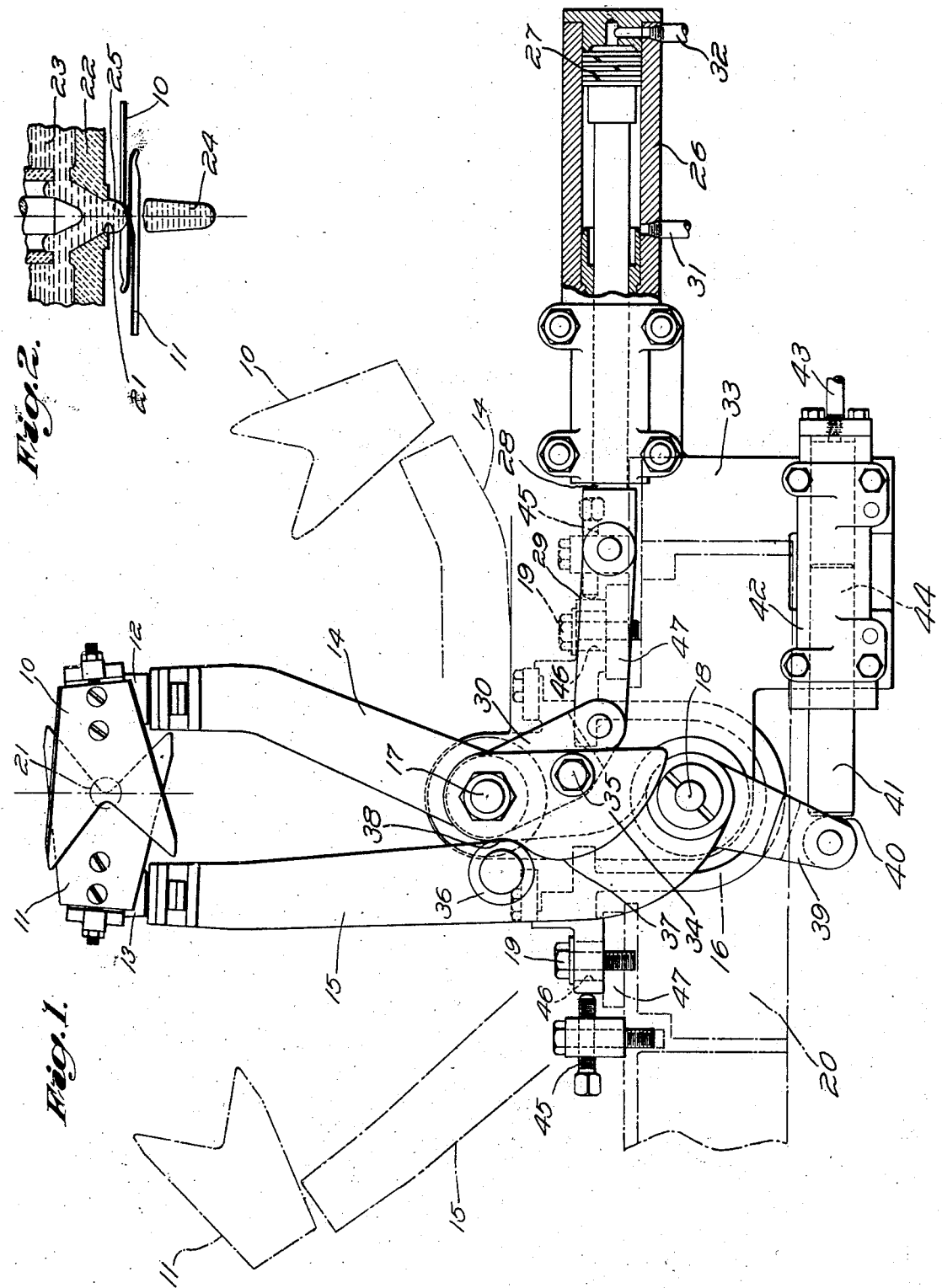

Patented June 11, 1946

2,401,994

UNITED STATES PATENT OFFICE 2,401,994

MOLTEN GLASS SEVERING METHOD AND MECHANISM

Walter C. Weber, West Hartford, Conn., assignor to Hartford-Empire Company, Hartford, Conn., a corporation of Delaware Application February 18, 1942, Serial No. 431,396

8 Claims. (Cl. 49—14)

This invention relates to improvements in methods of and mechanisms for severing mold charges from glass that is being supplied by a glass feeder.

Most glass feeders in use prior to this invention for the feeding of molten glass in mold charges included glass cutting shears, each comprising cooperative blades suitably supported and operated to cause the cutting edges of the blades to cross each other beneath the feed outlet of the feeder at the vertical center line of the outlet and to move past such vertical center line so that they overlap each other at the conclusion of their cutting strokes. The lower blade of such a severing mechanism tends to impart a lateral motion to the upper portion of each mold charge at the moment of its severance from the glass body or column that is left hanging from the outlet. This action of the lower shear blade is commonly termed "batting," and the effect thereof is to interfere with proper delivery of the falling charge to an underlying charge receiver.

It has been customary prior to the present invention to provide an anti-batting charge guide or abutment at the side of the charge opposite that toward which the lower shear blade moves on its cutting stroke. The contact of such a guide, examples of which are disclosed in the Peiler Patent No. 1,680,391 of Aug. 14, 1928, with the adjacent side of the mold charge serves to oppose the lateral displacement or batting of the upper end of the severed charge by the lower shear blade.

All such anti-batting guides of which I am aware are subject to certain disadvantages which are inherent in them because of their mode of operation, which necessarily involves contact of such a guide with a side of each severed charge. Such a contact may oppose, limit or reverse the lateral displacement of the upper part of the severed charge by the lower shear blade, the exact result obtained for any charge severing operation varying more or less with the particular position of the guide with relation to the charge at the instant of severance and for other causes.

An object of the present invention is to obviate lateral batting or displacement of the severed charges produced by a glass feeder equipped with a glass severing mechanism comprising cooperative shear blades without requiring the use of an anti-batting guide, abutment or other glass charge contacting member in opposition to the lowermost of such blades.

A further object of the invention is to provide a practicable and reliable method of severing mold charges from suspended mold charge bodies or columns below and in line with a glass feeder outlet, involving the use of cooperative shear blades but without causing the lower of such blades to impart a lateral motion to the upper part of each such severed charge.

The present invention may be usefully employed in connection with the operation of cooperative glass cutting shear blades of any suitable known form and structure. These shear blades may be supported in any suitable manner so that they may be closed at the vertical feeding axis or center line of the glass discharge outlet of a glass feeder at a level spaced a predetermined distance below such outlet. Operating means may be provided to impart opening and closing movements to the shear blades substantially as in the case of glass cutting shears in use prior to the present invention except that provision is made according to such invention to stop the closing or cutting movement of the lower blade at or just before its cutting edge arrives at the vertical feeding axis or center line of the glass discharge outlet. This will coincide with the axial or vertical center line of the pendant glass body or column from which a charge is being severed by the closing of the shear blades. Since the lower blade will be stationary at the instant of completion of the severance of the charge from the stub of glass that remains suspended from the feeder outlet above the shearing plane, no lateral batting or displacement of the charge by the lower blade will then occur. The severed charge therefore may fall with its axis vertical and thus be delivered properly to an underlying mold or other charge receiver.

When, as is generally the case, the shears comprise only an upper and a lower blade, the movement of the upper blade may be continued sufficiently to cause its cutting edge to pass the vertical feeding axis into overlapping relation with the lower blade. While the severance of each mold charge should in theory be completed at the instant the cutting edges of both blades arrive at the vertical feeding axis of the feeder, various circumstances which may be encountered in service, such as unequal wear on or play between relatively moving parts of the complete severing mechanism, imperfect machining of closely fitting parts, etc., may prevent the accomplishment of this result at all times. The overlap of the shear blades produced by the final closing movement of the upper shear blade assures complete, clean severance of every charge by the closing of the shear blades, even if any of such circumstances should exist or arise. It also permits stoppage of the cutting edge of the lower blade at any place within a limited distance short of the feeding axis without substantial impairment of the utility of the invention.

An important feature of the invention, however and by whatever means it may be carried out, is that the closing or cutting movement of the lower blade is stopped before such movement can be effective to impart an objectionable lateral motion to the upper part of the finally severed charge and that there is sufficient relative motion between the cooperative blades during their closing strokes to assure clean severance of each charge from the suspended supply body or column of glass.

Other features of the invention and advantages thereof hereinafter will be pointed out or will be apparent from the following description of a practical embodiment of the invention as shown in the accompanying drawing, in which:

Fig. 1 is a plan view of a pair of glass cutting shear blades suitably supported and provided with one form of operating mechanism suitable for use to perform the method of the invention; and Fig. 2 is a fragmentary vertical sectional view of a portion of a glass feeder with the shear blades in their closed positions beneath the feeder outlet after completion of severance of a mold charge, which is shown falling with its axis vertical.

The illustrative shearing mechanism shown in Fig. 1 comprises an upper shear blade 10 and a lower shear blade 11 respectively mounted on holders 12 and 13 which are carried by the free end portions of shear arms 14 and 15, respectively. The shear arms 14 and 15 are supported upon a bracket 16 for swinging movements about the vertical axes of vertical pivot pins or studs 17 and 18 which are carried by the bracket and on which such arms may be mounted in any suitable known manner. The bracket 16 is adjustably secured, as by the cap bolts 19, to a stationary supporting structure 20. The structure and arrangement of the parts which have been particularly pointed out so far are such that the shear blades are supported for swinging movements between the open positions indicated by dot-and-dash lines and closed positions at which they are located beneath an outlet of a feeder with which the invention is to be used.

The feeder outlet is indicated diagrammatically as a circle by dot-and-dash lines in Fig. 1 and by full lines in Fig. 2, being designated 21 in both views. Fig. 2 also shows a fragmentary portion of the feeder forehearth or glass feed container 22 which is provided with the outlet 21. The outlet 21 is continuously submerged by a feed body of molten glass 23 in the container 22 so that molten glass from such feed body may issue from the outlet and form therebeneath a suspended mold charge body or column. The latter may comprise the glass of a charge, designated 24, and the glass above the severing plane which, as indicated at 25 in Fig. 2, is left hanging from the outlet when the charge has been severed therefrom, as shown in Fig. 2.

The means shown in Fig. 1 for swinging the shear arm 14 and the upper blade 10 back and forth between the positions indicated in that view comprises a pressure fluid cylinder 26 in which a piston 27 is reciprocable. The piston 27 has a stem 28 projecting from one end of the cylinder 26 and connected by linkage indicated at 29 with the outer end of an actuating arm 30 which is mounted for swinging movements about the axis of the vertical pivot member 17 and is integral with or rigidly connected with the shear arm 14. The arms 14 and 30 may both be arms of a bell crank lever that is fulcrumed on the vertical pivot member 17 or they may be separate arms connected by any suitable known structural arrangement to cause both to swing in unison about the axis of the vertical member 17 when the arm 30 is swung about that axis, as by reciprocation of the piston 27 in the cylinder. Pipes 31 and 32 respectively communicate with the interior of the cylinder 26 at the forward and rearward end portions thereof. Any suitable known means (none shown) may be employed to supply any suitable known gaseous or liquid fluid to and to exhaust such fluid from the opposite ends of the cylinder 26 to cause the desired reciprocatory strokes of the piston in such cylinder.

The cylinder 26 may be mounted on a plate 33 which may be integral with the bracket 16 or rigidly connected with such bracket in any suitable known way so that both the bracket 16 and plate 33 may be adjusted as a unit on the main supporting structure 20.

The means shown in Fig. 1 for operating the lower blade carrying arm 15 and for synchronizing its movements with those of the arm 14 comprises a cam 34 mounted on the pivot member 17 and connected, as at 35, with the actuating arm 30 to turn with the latter about the axis of the pivot member 17. A roller 36 on the arm 15 is continuously in rolling contact with the working surface of the cam. Such working surface may be that of the side edge of the cam next to the arm 15 and may consist of a curved portion 37 eccentric to the pivot member 17 and an inner end portion 38 concentric with such pivot member. An actuating arm 39 for the arm 15 is mounted to swing about the vertical axis of the pivot member 18 in unison with the arm 15, and to this end may be formed as an arm of a bell crank lever of which the arm 15 is a part. A roller or abutment 40 on the arm 39 bears continuously against the outer end of a piston rod 41 projecting from one end of a cylinder 42. The cylinder 42 may be mounted on the plate 33 and may be provided at its rearward end with a pressure fluid conducting pipe 43 in communication with the space within the cylinder at the rear of the piston 44.

The operation of the illustrative embodiment of the invention just described will be readily understood. Pressure fluid may be applied simultaneously to the forward end of the cylinder 26 and the rearward end of the cylinder 42 under the control of any suitable timing means, none shown. The resultant movements of the pistons in these cylinders will cause closing movements of the shear arms. The speed and extent of the upper blade carrying arm 14 will be determined by the speed and extent of the rearward stroke of the piston 27 in the cylinder 26. The forward stroke of the piston 44 in the cylinder 42 will tend to cause a closing stroke of the lower blade carrying arm 15 but the speed and extent of such stroke will be controlled by the co-action of the cam roller 36 and the cam 34. It is preferred that the closing strokes of the two shear blades should be substantially alike in speed and character while both blades are being moved in unison or at least for the portions thereof during which the blades cut into the glass body toward the center line of such body. The cam surface therefore may be laid out to cause correspondence of closing movements between the shear blades while the cam roller 36 is in contact with the portion 37 of the cam surface and a closing movement is being imparted to the shear arm 14. When, however, the cam roller 36 reaches the concentric or dwell portion 38 of the cam surface, the swinging movement of the arm 15 will be stopped while the closing movement of the arm 14 is continued.

The stoppage of the arm 15 and of the lower blade 11 preferably is at the instant the cutting edge of such blade arrives at the vertical center line of the pendant body of molten glass from which a charge is being severed. When V-notched or V-edged shear blades are employed, as shown in Fig. 1, and as are preferred, the term "cutting edge" refers particularly to the portion at the apex of the angle formed by the blade edge, this being the portion that is last in cutting contact with glass of the pendant body during a charge severing operation. Obviously, shear blades having edges of various other known configurations may be employed.

The exact position at which the cutting edge of the lower blade will be stopped while the closing movement of the upper blade is continued may deviate somewhat from the preferred position referred to but such movement should be stopped before the cutting edge has moved past the feeding axis so as to cause an objectionable lateral batting of the severed charge.

The return or forward stroke of the piston 27 in the cylinder 26 will cause a return swinging movement of the arm 14 to its open position. The cam 34 will drive the roller 36 outward to swing the arm 15 to its open position. The pressure fluid in the cylinder 42 back of the piston may be permitted to exhaust through the pipe 43 or otherwise during the cam actuated opening movement of the arm 15 if desired to lessen the resistance to the action of the cam. However, the arrangement should be such as to cause the cam roller 36 to be held continuously against the cam.

Lateral adjustment of the shear mechanism on its support may be effected accurately to locate the cutting edge of the lower blade at the exact place desired in relation to the feeding axis on stoppage of the closing movement of such blade. As shown, such adjusting means comprises opposed adjusting screws 45 bearing against opposite side edges of the supporting bracket 16 and operable when the cap bolts 19 have been loosened to adjust such bracket and all the parts thereon horizontally in either of opposite directions relative to the stationary supporting structure 20. Horizontal slots 46 in the flanged attaching portions of the bracket 16 permit this adjustment. The bracket and its supported parts may be adjusted horizontally in a direction at right angles with that of the first adjustment by substituting spacing shims or washers 47 of greater or less thickness for those previously in use. Other known adjusting devices may be provided as dictated by individual preference or need.

The particular embodiment of the invention shown in the accompanying drawings and herein particularly described has been selected by way of example only. Many other specifically different structures may be provided to support and operate cooperative shear blades to carry out the broadly stated objects of the invention.

I claim:

1. The method of severing a mold charge from a body of molten glass in suspension from a feeder outlet which comprises moving a plurality of cooperative glass cutting blades edgewise into the glass of said body from different points around the vertical center line thereof toward such center line, and stopping the movement of the lowermost of said blades before its cutting edge crosses said vertical center line while causing continued relative movement between said blades to complete the severance of a charge from said body.

2. The method of severing a mold charge from a suspended column of molten glass which comprises closing cooperative glass cutting shear blades to cut through said column from opposite sides thereof and stopping the closing movement of the lower blade slightly before completion of the cut through said column to obviate lateral batting of the severed charge by said lower blade.

3. The method of severing a mold charge from a suspended column of molten glass by the use of a pair of cooperative glass cutting shear blades which comprises imparting closing movements to said blades to cause them to cut into said column from opposite sides thereof, stopping the closing movement of the lower of said blades before its cutting edge has passed beyond the vertical center line of said column and continuing the closing movement of the upper blade after stoppage of movement of the lower blade to complete the cut against such blade and to move into overlapping relation therewith.

4. The method of severing a mold charge from a vertical column of molten glass which comprises imparting closing movements to a pair of cooperative glass cutting shear blades to cause them to cut into said column from opposite sides thereof toward positions at which their cutting edge portions will overlap each other, and stopping the closing movement of the lower of said blades before the conclusion of the closing movement of the other of said blades.

5. A glass cutting mechanism comprising a plurality of cooperative shear blades, means on which said blades are mounted for relative movement between open positions at which the blades are spaced apart and closed positions at which the cutting edge portions of the blades are in overlapping relation, means for moving said blades toward closing position, and means operatively associated with at least one of said blades to terminate the closing movement of the lower blade prior to the termination of the closing movement of the upper blade.

6. A mechanism for severing a column of molten glass in suspension from the outlet of a glass feeder, comprising a pair of glass cutting shear blades, means on which said blades are mounted for closing movement from opposite sides of said column toward the vertical center line thereof, means for moving said blades, and means operatively associated with said blades, and constructed and arranged to stop the closing movement of the lower of said blades before its cutting edge has crossed said vertical center line and before the conclusion of the closing movement of the upper blade.

7. A mechanism for severing a column of molten glass in suspension from the outlet of a glass feeder comprising a pair of glass cutting shear blades, means for mounting said blades for closing movements from opposite sides of said column toward the vertical center line thereof, and operating means for said shear blades constructed and arranged to cause like closing movements of said blades until just before the cutting edges of said blades cross each other at about the center line of said column, to then stop the closing movement of the lower blade and to continue the closing movement of the upper blade for the additional distance required to complete the overlap of the cutting edge of said lower blade.

8. A shear mechanism for a glass feeder having a downwardly opening glass feed outlet, said mechanism comprising a pair of cooperative upper and lower blades, pivoted shear arms respectively carrying said upper and lower blades and supporting them for movements between open positions at which they are spaced apart and closed positions at which the cutting edge portions of the blades are in overlapping relation beneath said feeder outlet, means for oscillating the upper blade carrying shear arm about its pivotal axis, a cam operable by said upper blade carrying arm to turn about the pivotal axis of the latter when said arm is oscillated, a cam follower carried by the lower blade carrying shear arm, and yieldable means acting on said last named arm to urge it toward closed position concurrently with closing movement of the upper blade carrying arm and to maintain said follower in working contact with said cam, said cam coacting with said follower to stop the closing movement of the lower blade before its cutting edge crosses the vertical center line of the feeder outlet and to permit continued closing movement of the upper blade across said center line.

WALTER C. WEBER.